United States Patent
Gururaja et al.

(10) Patent No.: US 11,487,956 B2
(45) Date of Patent: Nov. 1, 2022

(54) SYSTEMS AND METHODS OF DETECTING SCAN AVOIDANCE EVENTS

(71) Applicant: ZEBRA TECHNOLOGIES CORPORATION, Lincolnshire, IL (US)

(72) Inventors: Abhilash Gururaja, Levittown, NY (US); Christopher J. Fjellstad, Smithtown, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 176 days.

(21) Appl. No.: 16/860,960

(22) Filed: Apr. 28, 2020

(65) Prior Publication Data

US 2021/0334479 A1 Oct. 28, 2021

(51) Int. Cl.
*G07G 1/00* (2006.01)
*G06K 5/04* (2006.01)
*G07G 3/00* (2006.01)
*G06Q 20/20* (2012.01)
*G06V 20/40* (2022.01)
*G06V 20/52* (2022.01)

(52) U.S. Cl.
CPC ............ *G06K 5/04* (2013.01); *G06Q 20/203* (2013.01); *G06Q 20/208* (2013.01); *G06V 20/40* (2022.01); *G06V 20/52* (2022.01); *G07G 1/0081* (2013.01); *G07G 3/003* (2013.01); *G06V 20/44* (2022.01)

(58) Field of Classification Search
CPC .. G06K 7/10; G06K 7/10544; G06K 7/10821; G06K 7/10861; G06K 7/1096; G06K 7/14; G06K 7/1404; G06K 7/1413; G06K 7/1417; G06K 7/1408; G06K 7/1439; G06K 7/1443; G06K 7/1447; G06K 9/00711; G06K 9/00718; G06K 9/00771; G06K 2009/00738; G06Q 20/203; G07G 1/00; G07G 1/0036; G07G 1/0045; G07G 1/0054; G07G 1/0081; G07G 1/01; G07G 1/12; G07G 3/00; G07G 3/003
See application file for complete search history.

(56) References Cited

U.S. PATENT DOCUMENTS

| | | | | |
|---|---|---|---|---|
| 2012/0048926 | A1* | 3/2012 | Naito | G07G 1/0045 235/383 |
| 2016/0078300 | A1* | 3/2016 | Kundu | G07F 19/207 348/150 |
| 2018/0033256 | A1* | 2/2018 | Hamidat | G06K 7/1447 |
| 2019/0311167 | A1* | 10/2019 | Powell | G06K 7/1413 |
| 2021/0295078 | A1* | 9/2021 | Barkan | G06K 9/183 |

* cited by examiner

*Primary Examiner* — Thien M Le
*Assistant Examiner* — April A Taylor
(74) *Attorney, Agent, or Firm* — Yuri Astvatsaturov

(57) ABSTRACT

Methods of detecting scan avoidance events when items are passed through a field of view (FOV) of a scanner are disclosed herein. An example method, during a decode session, receiving, at one or more processors of the symbology reader, an image of an object; during a timeout period, detecting, at the one or more processors, an indicia in the image of the object, the indicia having a decodable payload; during the timeout period, attempting to decode the indicia to identify the decodable payload, at the one or more processors; and after the timeout period expires, when at least one portion but less than all portions of the indicia is decodable, determining a potential scan avoidance attempt and generating a scan avoidance alarm signal.

20 Claims, 4 Drawing Sheets

SYSTEMS AND METHODS OF DETECTING SCAN AVOIDANCE EVENTS

BACKGROUND

In a retail environment, purchasing items typically involves using a barcode reader at a point-of-sale (POS) system to capture images of barcodes attached to each item to be purchased, and decoding the images to identify each item being purchased. In some cases, retail employees scan barcodes on each item a customer wishes to purchase, while in other cases, customers scan the barcodes on items they wish to purchase at self-checkout stations.

SUMMARY

In an embodiment, a computer-implemented method for detecting a potential scan avoidance during a decode session using a symbology reader comprises: receiving, at one or more processors of the symbology reader, an image of an object; during a timeout period, detecting, at the one or more processors, an indicia in the image of the object, the indicia having a decodable payload; during the timeout period, attempting to decode the indicia to identify the decodable payload, at the one or more processors; and after the timeout period expires, when at least one portion but less than all portions of the indicia is decodable, determining a potential scan avoidance attempt and generating a scan avoidance alarm signal.

In variations of the above embodiment, the indicia includes a first portion and a second portion, and the method further comprises: attempting to decode, during the timeout period, the first portion; attempting to decode, during the timeout period, the second portion; and in response to failing to decode, during the timeout period, only one of the first portion and the second, determining the potential scan avoidance attempt.

In an embodiment, a computer-implemented method for detecting a potential scan avoidance during a decode session using a symbology reader comprises: receiving, at one or more processors of the symbology reader, an image of an object; during a timeout period, detecting, at the one or more processors, an indicia in the image of the object, the indicia having a decodable payload; during the timeout period, attempting to decode the indicia to identify the decodable payload, at the one or more processors; and after the timeout period expires, when at least one portion but less than all portions of the indicia is decodable, determining a potential scan avoidance attempt and generating a scan avoidance alarm signal, wherein the indicia includes a first portion and a second portion, and the method further comprises: attempting to decode, during the timeout period, the first portion; attempting to decode, during the timeout period, the second portion; and in response to failing to decode, during the timeout period, only one of the first portion and the second, determining the potential scan avoidance attempt, wherein the symbology reader includes a bi-optic reader having a tower portion with a first field of view and a platter portion with a second field of view, and the image is a first image, the method further comprising: attempting to decode, during the timeout period, the first portion from a second image of the object captured from the first field of view; attempting to decode, during the timeout period, the second portion from a third image of the object captured from the second field of view; and in response to successfully decoding, within the timeout period, the first portion and the second portion, fully decoding the indicia, determining the decodable payload, and providing the payload to a point-of-sale system.

In variations of the above embodiments, the indicia includes two or more portions, and the method further comprises: determining, during the timeout period, which of the two or more portions are decodable; and in response to failing to decode at least one of and less than all the portions during the timeout period, determining the potential scan avoidance attempt.

In another embodiment, a system, for detecting a scan avoidance event during a decode session of a symbology reader, comprises: an imaging assembly configured to capture an image of an object; a barcode decoder configured to, during a timeout period, identify a missing portion of an indicia in the image of the object, identify two or more blocks of the indicia, and attempt to decode the two or more blocks; and a scan avoidance event detector configured to, in response to the missing portion being identified, determine a potential scan avoidance attempt, and generating a scan avoidance alarm signal.

In variations of the above embodiment, the system includes a processor; and a tangible machine-readable storage medium storing machine-readable instructions that, when executed by the processor, cause the processor to implement the scan avoidance event detector.

In another embodiment, a system, for detecting a scan avoidance event during a decode session of a symbology reader, comprises: an imaging assembly configured to capture an image of an object; a barcode decoder configured to, during a timeout period, identify a missing portion of an indicia in the image of the object, identify two or more blocks of the indicia, and attempt to decode the two or more blocks; and a scan avoidance event detector configured to, in response to the missing portion being identified, determine a potential scan avoidance attempt, and generating a scan avoidance alarm signal, wherein: the symbology reader includes a bi-optic reader having a tower portion with a first field of view and a platter portion with a second field of view, and the image is a first image; the barcode reader is configured to attempt to decode, during the timeout period, the first portion from a second image of the object captured from the first field of view, and attempt to decode, during the timeout period, the second portion from a third image of the object captured from the second field of view; and the scan avoidance event detector is configured to, in response to successfully decoding, within the timeout period, the first portion and the second portion, fully decoding the indicia, determining the decodable payload, and providing the payload to a point-of-sale system.

Figure 1:
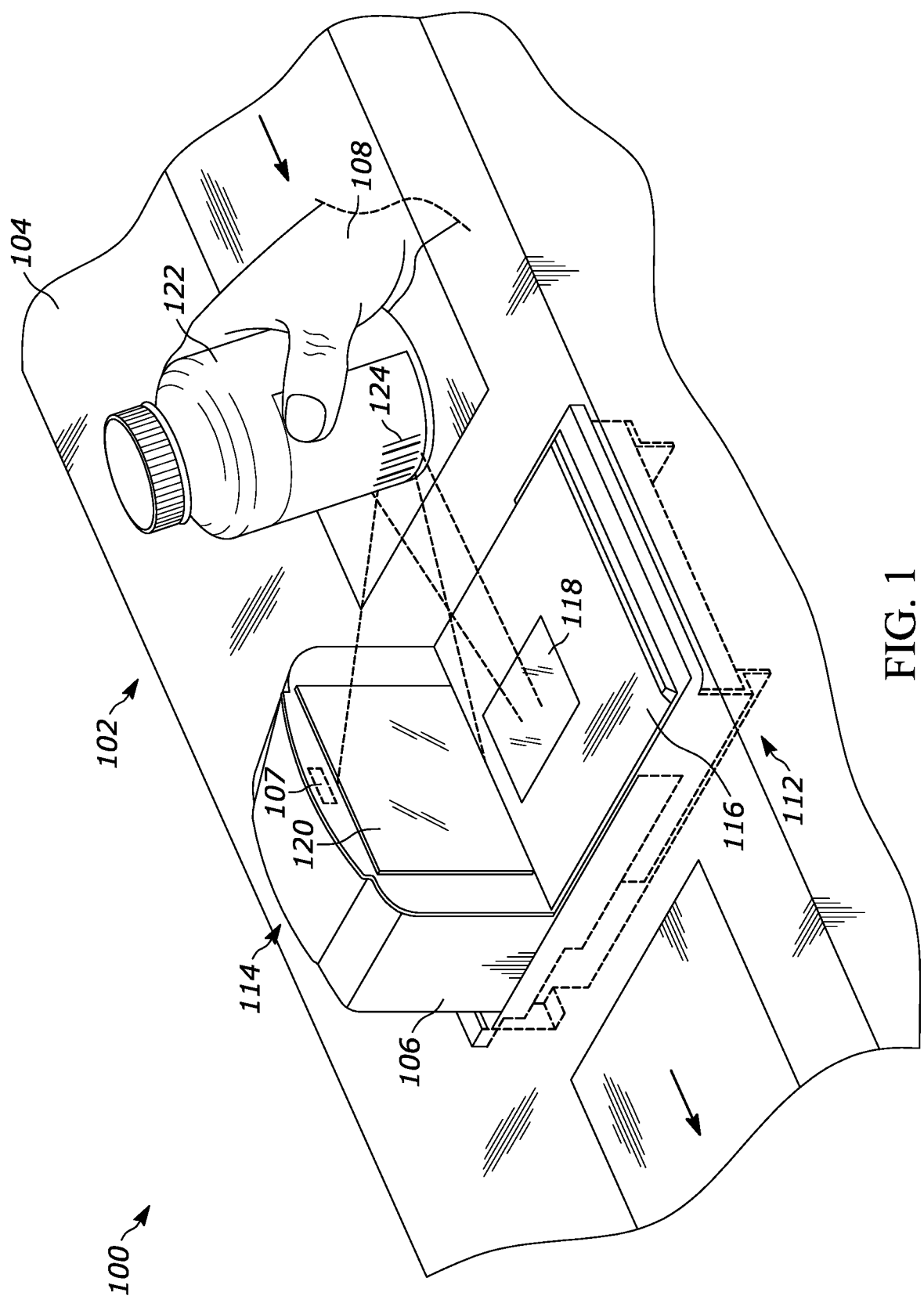
FIG. 1 illustrates a perspective view of an example POS system, in accordance with aspects of this disclosure.

In the accompanying figures, like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention. In general, the same reference numbers will be used throughout the drawing(s) and accompanying written description to refer to the same or like parts.

The apparatus and method components have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein. Skilled artisans will readily recognize from the following discussion that alternate embodiments of the structures and methods illustrated herein may be employed without departing from the principles set forth herein.

DETAILED DESCRIPTION

As a retail employee or customer scans items for purchase, "scan avoidance," which may be accidental or intentional, may occur. In some examples, during scan avoidance, an indicia (e.g., a barcode, a quick response (QR) code, etc.) attached to, affixed to, printed on, etc. an item that is moved through one or more field of views (FOVs) of the barcode reader is not adequately imaged and/or decoded, and the item is bagged and taken without a purchase occurring. Scan avoidance represents loss of revenue due to theft, accident, misuse, etc. For instance, a retail employee or a customer may accidentally (or intentionally) move an item through the FOV of the scanner too quickly so that an image of a barcode attached to the item cannot be adequately imaged (e.g., due to blur, partially covered, improper lighting, out of focus, etc.). As another example, a retail employee or a customer may accidentally (or intentionally) cover, obscure, block, remove, etc. some or all of the barcode attached to an item, so that not all of the barcode on the item can be imaged. Example barcodes include two or more blocks or portions that represent digits of a multi-digit number such as a universal product code (UPC) or European article number (EAN). Example QR codes (i.e., two-dimensional barcodes) are also formed of two or more blocks or portions.

When a scan avoidance event occurs, it has been advantageously discovered that image(s) of one or more blocks of an indicia will not be adequately imaged (e.g., without sufficient focus, lighting, contrast, distinctness, etc.) and/or will not be correctly decodable within a timeout period. Accordingly, in disclosed examples, when not all of the blocks or portions of an indicia (e.g., a barcode, a QR code, etc.) can be adequately imaged and decoded during a timeout period, then it is likely that a scan avoidance event has occurred, and a store manager can be notified. Advantageously, the examples disclosed herein allow a reduction in lost revenue, without the use of expensive and/or complex neural networks and/or complex image processing currently in use in some retail stores that may prevent their usage. While for ease of discussion, the following disclosure refers to barcodes and portions, the examples disclosed herein may be used to identify, detect, flag, alert scan avoidance events for any number and/or type(s) of indicia including, barcodes, QR codes, custom codes, etc. having two or more portions or blocks. Further, while the following disclosure refers to barcode readers, the examples disclosed herein may be used with any number and/or type(s) of bi-optical readers, bi-optic readers, symbology readers, etc. for use with any number and/or type(s) of scanners including, for example, barcode readers, handheld barcode readers, presentation mode barcode readers, etc. Further, while example barcode readers are disclosed in conjunction with point-of-sale (POS) systems, aspects of this disclosure to detect scan avoidance events can be used in conjunction with storage systems, inventory systems, etc.

FIG. 1 illustrates a perspective view of an example POS system 100 having a workstation 102 with a counter 104 and a bi-optic barcode reader 106 that may be used to implement the example systems and methods disclosed herein to detect potential scan avoidance events when one or more portions of an indicia are not adequately imaged and/or decodable. The POS system 100 is often managed, operated, etc. by a store employee such as a clerk 108. However, in other cases the POS system 100 may be a part of a so-called self-checkout lane where instead of a clerk, a customer is responsible for checking out his or her own products.

The barcode reader 106 includes a first (e.g., lower) housing 112 and a second (e.g., raised, vertical or tower) housing 114. The lower housing 112 includes a top portion 116 with a first optically transmissive window 118 positioned therein along a generally horizontal plane relative to the overall configuration and placement of the barcode reader 106. Generally speaking, the top portion 116 includes a removable or a non-removable weigh platter (e.g., an electronic scale configured to measure/register the weight of objects placed on the top portion 116). The top portion 116 is positioned substantially parallel with a top surface of the counter 104. As set forth herein, the phrase "substantially parallel" means+/−30° of parallel and/or accounts for manufacturing tolerances. While in FIG. 1, the counter 104 and the top portion 116 are illustrated as being about co-planar, the top portion 116 and the counter 104 may, additionally and/or alternatively, be considered as being about parallel. In some examples, the surface of the counter 104 is raised or lowered relative to the top portion 116, while the top portion 116 remains substantially parallel with the top surface of the counter 104. The raised housing 114 is configured to extend above the top portion 116 and includes a second optically transmissive window 120 positioned in a generally upright plane relative to the top portion 116 and/or the first optically transmissive window 118. Note that references to "upright" include, but are not limited to, vertical. Thus, as an example, something that is upright may deviate from a vertical axis/plane by as much as 30°.

In practice, a product, object, item 122, etc., such as for example a bottle, is moved, swiped, etc. past the barcode reader 106 such that a barcode 124 associated with the item 122 is read (e.g., imaged and decoded) through at least one of the first optically transmissive window 118 and the second optically transmissive window 120. This is particularly done by positioning the item 122 within fields of view (FOV) of digital imaging sensor(s) (e.g., imaging assemblies 212, 214 (FIG. 2), a camera 107) housed inside the barcode reader 106 behind the windows 118 and 120. Additionally, as the item 122 is moved past the barcode reader 106, the cameras obtain image data of the item 122. In some examples, the image data is to verify that the item 122 scanned matches the barcode 124. The barcode 124 and/or information associated with the barcode 124 can be used to identify the item 122, determine a price for the item 122, etc.

Figure 2:
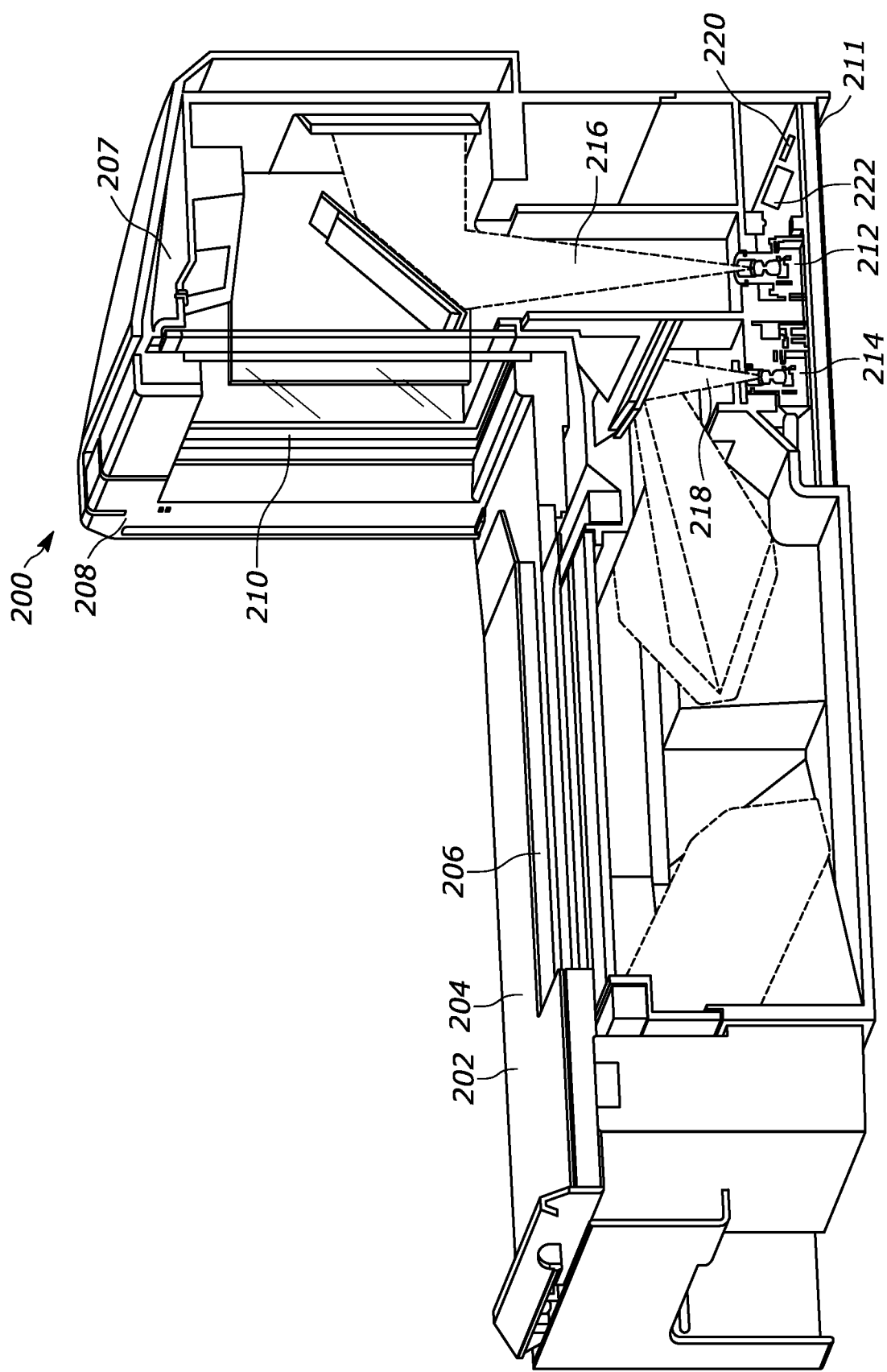
FIG. 2 illustrates a cross-sectional perspective view of an example bi-optic barcode reader including a scan avoidance event detector, in accordance with aspects of this disclosure.

FIG. 2 illustrates a cross-sectional perspective view of an example bi-optic barcode reader 200 that can be used to implement the barcode reader 106 of FIG. 1, in accordance with embodiments of this disclosure. As shown, the barcode reader 200 includes an example first (e.g., lower or platter) housing portion 202 that supports a generally horizontal weigh platter 204 having a first, generally horizontal window 206. The barcode reader 200 is also shown including an example second (e.g., raised, vertical or tower) housing portion 208 that supports a second, generally vertical optically transmissive window 210. As shown, the first window 206 is substantially perpendicular relative to the second window 210. As set forth herein, the phrase "substantially perpendicular" means +/−30° of perpendicular and/or accounts for manufacturing tolerances.

To enable imaging data to be obtained by the barcode reader 200, the barcode reader 200 includes a printed circuit board (PCB) 211 with one or more imaging assemblies 212, 214 (e.g., cameras). Each of the imaging assemblies 212, 214 includes an imaging sensor having a plurality of photosensitive elements that define a substantially flat surface along with other components such as a housing and lens(es) for capturing image data for a FOV. The arrangement and configuration of the components including the imaging sensor, the photosensitive elements, the housing, the lens(es) define a specific FOV for each of the imaging assemblies 212, 214. As shown, the first imaging assembly 212 is configured to capture image data over a first FOV 216 and the second imaging assembly 214 is configured to capture image data over a second FOV 218. The image data captured by the first and second imaging assemblies 212, 214 may include image data representative of an environment in which a barcode or target may appear. In some examples, the logic circuit 400 of FIG. 4 implements the PCB 211. In various examples, the processes described in reference to PCB 211 may be achieved in hardware, in software, firmware, or in some combination thereof.

To decode indicia from images of indicia, the PCB 211 includes any number and/or type(s) of barcode decoder 220. To detect potential scan avoidance events, the PCB 211 includes an example scan avoidance event detector 222. The scan avoidance event detector 222 detects potential scan avoidance events when an indicia 124 cannot be adequately and/or wholly imaged (e.g., without sufficient focus, lighting, contrast, distinctness, etc.) and/or cannot be correctly decodable in its entirety. For example, when: (i) one or more portions of an indicia 124 is covered up or marred with a finger, hand, tape, writing utensil, etc.; (ii) when one or more portions of an indicia 124 cannot be imaged because one of the windows 206, 210 is partly or wholly obstructed, and the associated item 122 is positioned so its indicia 124 cannot be wholly imaged by the other window 206, 210; (iii) part of an indicia is removed wholly or partly with a sharp instrument; (iv) when an item 122 is scanned too quickly or erratically to be fully and adequately imaged; (v) etc.

When an indicia (e.g., a barcode, a QR code, etc.) can only be partially decoded (e.g., if at least one portion but not all portions of the indicia 124 can be correctly decoded, the indicia 124 can only be partially decoded, there is a missing portion, etc.), then it is likely that a scan avoidance event has occurred. For example, when some but not all of the blocks or portions of an indicia (e.g., a barcode, a QR code, etc.) cannot be adequately and wholly imaged and decoded during a timeout period, then it is likely that a scan avoidance event has occurred. An example timeout period represents a time duration (e.g., five hundred milliseconds) during which it is determined whether all portions of indicia can be correctly decodable. When a scan avoidance event is likely, the scan avoidance event detector 222 generates a scan avoidance alert signal, alert, notification, report, etc. In some examples, when the item 122 is additionally, correctly scanned during the same timeout period, the scan avoidance event is not determined. In some examples, an indication of the generated alert indicating the potential scan avoidance event is presented to a user of the barcode reader 200, e.g., via a user interface of a POS system 100. Additionally and/or alternatively, an indication of the generated alert indicating the potential scan avoidance event may be sent to another (e.g., remote) computing device for presentation to an individual distinct from a user of the barcode reader (e.g., a manager, owner, or other stakeholder associated with the retail environment). Further, the alert may be stored, recorded, etc. for subsequent recall. Alerts, notifications, etc. can be sent, transferred, etc. via any number and/or type(s) of communication interfaces, devices, networks, etc.

In some examples, generating the alert or notification indicating the potential scan avoidance event includes capturing an image of a user of the barcode reader 200 via another camera distinct from the barcode reader's camera(s) 212, 214. For example, the additional camera may be positioned and/or angled to capture an image of the face of a user operating the barcode reader 200. In some examples, a facial recognition algorithm may be used to analyze the image of the face of the user to identify the user associated with the potential scan avoidance event. In other examples, the image of the face of the user operating the barcode reader 200 may be sent to a computing device associated with a manager, owner, or other stakeholder associated with the retail environment.

Figure 4:
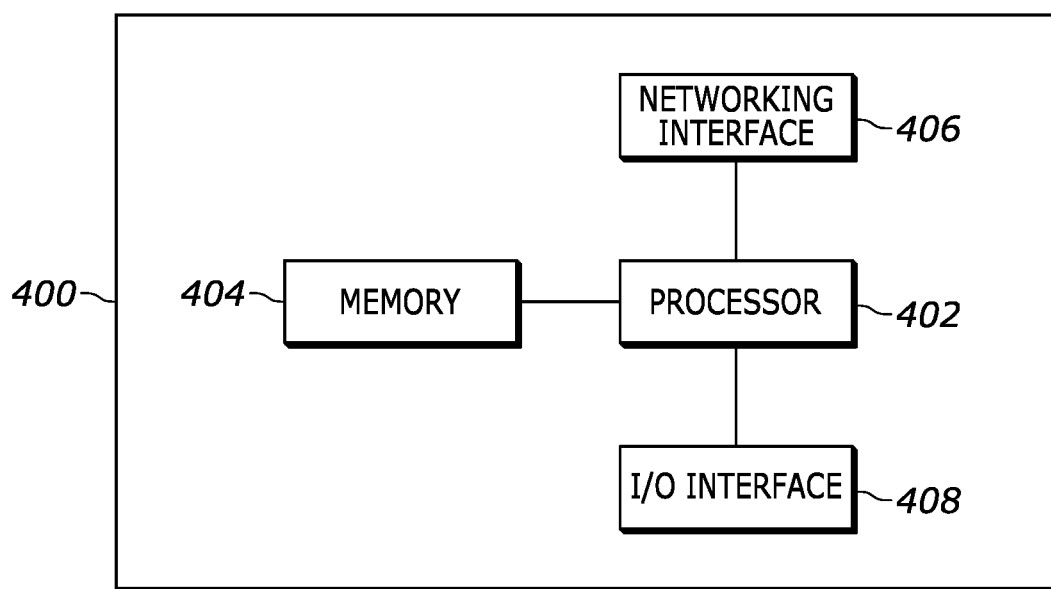
FIG. 4 is a block diagram of an example logic circuit to implement the example methods, apparatus, logic, and/or operations described herein.

In some examples, the scan avoidance event detector 222 is implemented as one or more modules of machine-readable instructions executing on a processor or logic device, such as the processor 402 of the logic circuit 400 of FIG. 4.

Figure 3:
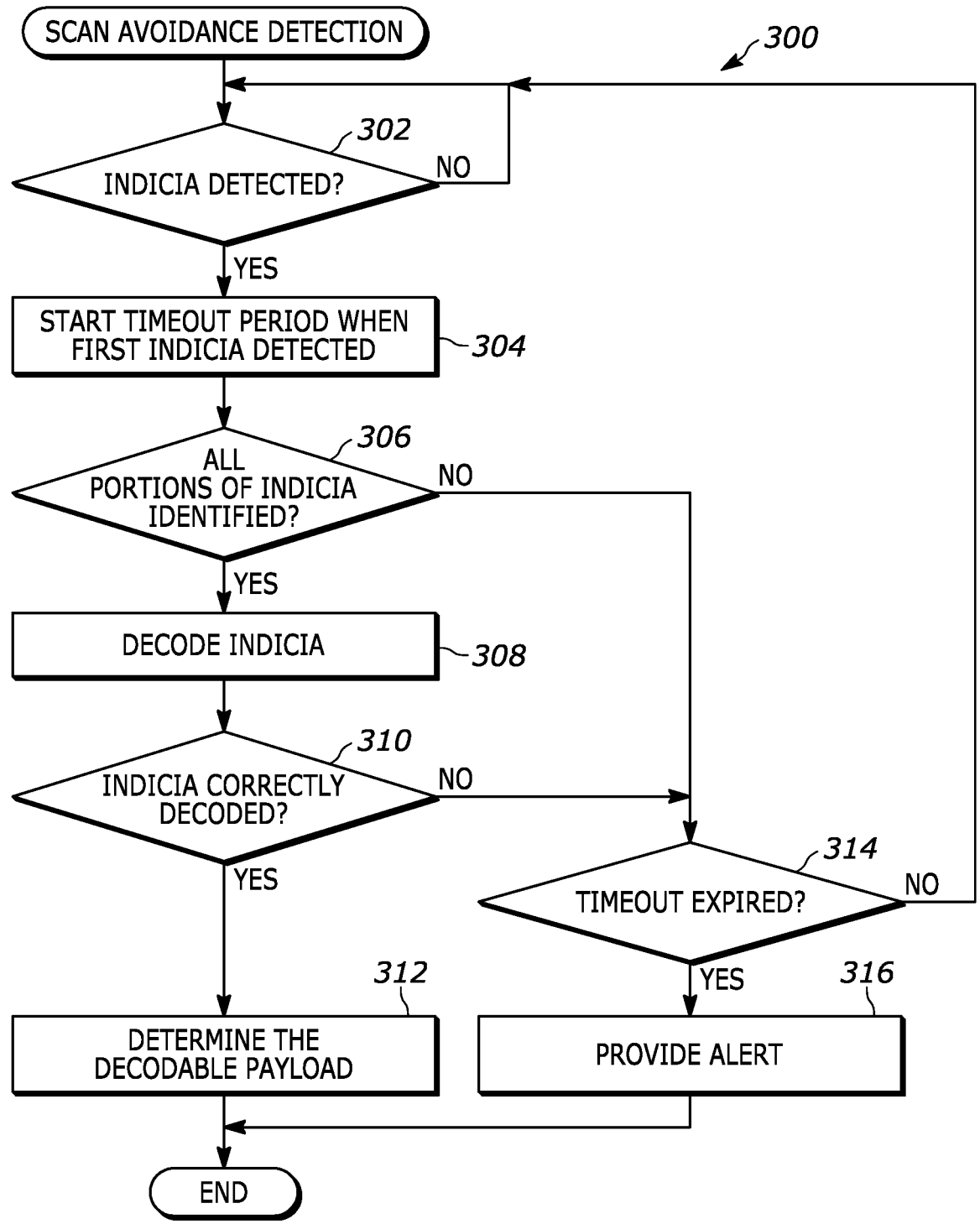
FIG. 3 is a flowchart representative of example methods, logic or machine-readable instructions for implementing the example scan avoidance event detector of FIG. 1, in accordance with aspects of this disclosure.

A flowchart 300 representative of example processes, methods, logic, software, computer- or machine-readable instructions for implementing the barcode reader 200 and the scan avoidance event detector 222 is shown in FIG. 3. In some examples, the example processes, methods, logic, software, computer- or machine-readable instructions of FIG. 3 are carried out during a decode session of the barcode reader 200. The program of FIG. 3 begins at block 302 when an indicia 124 is detected (block 302). When the indicia 124 detected is a first or initial indicia 124, a timeout period is started (block 304). An example timeout period represents a time duration (e.g., five hundred milliseconds) during which it is determined whether all portions of indicia can be correctly decodable.

If all portions of the indicia 124 are detected during a timeout period (block 306), the barcode decoder 220 attempts to decode the indicia 124 during the timeout period (block 308). If the indicia 124 correctly decodes during the timeout period (block 310), the barcode reader 220 determines the payload of the indicia (block 312), and control exits from the program of FIG. 3. While not shown in FIG. 3 for clarity of illustration, when the indicia 124 is decodable (block 310), it is conveyed to a POS system.

Returning to block 310, if the indicia 124 does not correctly decode (block 310) (e.g., if at least one portion but not all portions of the indicia 124 can be correctly detected and/or decode, the indicia 124 can only be partially detected and/or decoded, there is a missing portion, etc.) during the timeout period (block 314), the scan avoidance detector 222 alerts, provides, stores, etc. a potential scan avoidance event (block 316), control exits from the example program of FIG. 3.

Returning to block 306, if at least one portion but not all portions of the indicia 124 are detected (e.g., if at least one portion but not all portions of the indicia 124 can be correctly detected and/or decode, the indicia 124 can only be partially detected and/or decoded, there is a missing portion, etc.) (block 306) during the timeout period (block 314), the scan avoidance detector 222 alerts, provides, stores, etc. a potential scan avoidance event (block 316), and control exits from the example program of FIG. 3.

FIG. 4 is a block diagram representative of an example logic circuit capable of implementing, for example, the barcode decoder 220, the scan avoidance event detector 222 and/or, more generally, the PCB 211. The logic circuit of FIG. 4 is a processing platform 400 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 400 of FIG. 4 includes an example processor 402 such as, for example, one or more microprocessors, controllers, and/or any suitable type of processor. The processing platform 400 of FIG. 4 includes memory (e.g., volatile memory, non-volatile memory) 404 accessible by the processor 402 (e.g., via a memory controller). The processor 402 interacts with the memory 404 to obtain, for example, machine-readable instructions stored in the memory 404 corresponding to, for example, the operations represented by the flowcharts and/or examples of this disclosure. Additionally or alternatively, machine-readable instructions corresponding to the example operations described herein may be stored on one or more removable media (e.g., a compact disc (CD), a digital versatile disk (DVD), removable flash memory, etc.) that may be coupled to the processing platform 400 to provide access to the machine-readable instructions stored thereon. The machine-readable instructions may be executed by the processor 402 to implement barcode decoder 220 and the scan avoidance event detector 222. The memory 404 may additionally store scan avoidance event alerts at the barcode reader 200, a remote server, etc.

The example processing platform 400 of FIG. 4 also includes a network interface 406 to enable communication with other machines via, for example, one or more networks. The network interface 406 includes any suitable type of communication interface(s) (e.g., wired and/or wireless interfaces) configured to operate in accordance with any suitable protocol(s). The network interface 406 may be used to communicatively couple the barcode reader 200 to a remote device.

The processing platform 400 of FIG. 4 also includes input/output (I/O) interfaces 408 to access image data from imaging devices, cameras, the imaging assemblies 212, 214, etc.

Although FIG. 4 depicts the I/O interfaces 408 as a single block, the I/O interfaces 408 may include a number of different types of I/O circuits or components that enable the processor 402 to communicate with peripheral I/O devices. Example interfaces 408 include an Ethernet interface, a universal serial bus (USB) interface, a Bluetooth® interface, a near field communication (NFC) interface, and/or a PCI Express interface. The peripheral I/O devices may be any desired type of I/O device such as a keyboard, a display (a liquid crystal display (LCD), a cathode ray tube (CRT) display, a light emitting diode (LED) display, an organic light emitting diode (OLED) display, an in-place switching (IPS) display, a touch screen, etc.), a navigation device (a mouse, a trackball, a capacitive touch pad, a joystick, etc.), a speaker, a microphone, a printer, a button, a communication interface, an antenna, etc.

The above description refers to a block diagram of the accompanying drawings. Alternative implementations of the example represented by the block diagram include one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more DSPs, one or more ASICs, one or more FPGAs, one or more MCUs, one or more hardware accelerators, one or more special-purpose computer chips, and one or more SoC devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A computer-implemented method for detecting a potential scan avoidance during a decode session using a symbology reader, the method comprising:
receiving, at one or more processors of the symbology reader, an image of an object;
during a timeout period, detecting, at the one or more processors, an indicia in the image of the object, the indicia having a decodable payload;
during the timeout period, attempting to decode the indicia to identify the decodable payload, at the one or more processors; and
after the timeout period expires, when at least one portion but less than all portions of the indicia is decodable, determining a potential scan avoidance attempt and generating a scan avoidance alarm signal.

2. The method of claim 1, further comprising starting the timeout period in response to detecting the indicia.

3. The method of claim 1, wherein the symbology reader includes a bi-optic reader having a tower portion with a first field of view and a platter portion with a second field of view, and further comprising detecting the indicia in either the first field of view or the second field of view.

4. The method of claim 1, wherein the indicia includes a first portion and a second portion, the method further comprising:
attempting to decode, during the timeout period, the first portion;
attempting to decode, during the timeout period, the second portion; and
in response to failing to decode, during the timeout period, only one of the first portion and the second, determining the potential scan avoidance attempt.

5. The method of claim 4, wherein the indicia includes a universal product code (UPC) barcode or an European article number (EAN) barcode.

6. The method of claim 4, wherein the symbology reader includes a bi-optic reader having a tower portion with a first field of view and a platter portion with a second field of view, and the image is a first image, the method further comprising:
attempting to decode, during the timeout period, the first portion from a second image of the object captured from the first field of view;
attempting to decode, during the timeout period, the second portion from a third image of the object captured from the second field of view; and
in response to successfully decoding, within the timeout period, the first portion and the second portion, fully decoding the indicia, determining the decodable payload, and providing the payload to a point-of-sale system.

7. The method of claim 1, wherein the indicia includes two or more portions, the method further comprising:
determining, during the timeout period, which of the two or more portions are decodable; and
in response to failing to decode at least one of and less than all the portions during the timeout period, determining the potential scan avoidance attempt.

8. The method of claim 7, further comprising in response to fully decoding the indicia, determining the decodable payload, and providing the payload to a point-of-sale system.

9. The method of claim 7, further comprising capturing at least two of the two or more portions in different fields of view of the symbology reader.

10. The method of claim 1, wherein the symbology reader includes a bi-optic reader having a tower portion with a first field of view and a platter portion with a second field of view, the method further comprising:
partially decoding, during the timeout period, the indicia from the image of the object captured from one of the first field of view and the second field of view; and
in response to failing to determine the decodable payload from the indicia during the timeout period, tagging, in the scan avoidance alarm signal, which of the first field of view or the second field of view captured the image of the object.

11. The method of claim 1, the method further comprising, in response to determining the potential scan avoidance attempt, identifying an image captured of the object during the timeout period.

12. The method of claim 1, wherein the symbology reader includes a bi-optic reader having a housing, a tower portion with a first field of view, a platter portion with a second field of view, and a camera, the method further comprising, in response to determining the potential scan avoidance attempt, identifying an image captured of the object during the potential scan avoidance attempt and identifying the tower portion, the platter portion, or the camera capturing the image, the camera interior or exterior to the housing.

13. The method of claim 12, wherein the image contains at least a portion of the indicia.

14. The method of claim 1, wherein the symbology reader includes at least one of a handheld reader, or a presentation mode reader.

15. The method of claim 1, further comprising sending the scan avoidance alarm signal to at least one of (i) a remote device for presentation to an individual distinct from a user of the symbology reader, or (ii) a user of the symbology reader.

16. A system for detecting a scan avoidance event during a decode session of a symbology reader, the system comprising:
an imaging assembly configured to capture an image of an object;
a barcode decoder configured to, during a timeout period, identify a missing portion of an indicia in the image of the object, identify two or more blocks of the indicia, and attempt to decode the two or more blocks; and
a scan avoidance event detector configured to, in response to the missing portion being identified, determine a potential scan avoidance attempt, and generating a scan avoidance alarm signal.

17. The system of claim 16, further comprising:
a processor; and
a tangible machine-readable storage medium storing machine-readable instructions that, when executed by the processor, cause the processor to implement the scan avoidance event detector.

18. The system of claim 16, wherein:
the indicia includes a first portion and a second portion;
the barcode decoder is configured to attempt to decode, during the timeout period, the first portion, and attempt to decode, during the timeout period, the second portion; and
the scan avoidance event detector is configured to, in response to failing to decode, during the timeout period, only one of the first portion and the second portion, determine the potential scan avoidance attempt.

19. The system of claim 16, wherein:
the symbology reader includes a bi-optic reader having a tower portion with a first field of view and a platter portion with a second field of view, and the image is a first image;
the barcode reader is configured to attempt to decode, during the timeout period, the first portion from a second image of the object captured from the first field of view, and attempt to decode, during the timeout period, the second portion from a third image of the object captured from the second field of view; and
the scan avoidance event detector is configured to, in response to successfully decoding, within the timeout period, the first portion and the second portion, fully decoding the indicia, determining the decodable payload, and providing the payload to a point-of-sale system.

20. The system of claim 16, wherein:
the symbology reader includes a bi-optic reader having a housing, a tower portion with a first field of view, a platter portion with a second field of view, and a camera; and
the scan avoidance event detector is configured to, in response to determining the potential scan avoidance attempt, identify an image captured of the object during the potential scan avoidance attempt, and identify the tower portion, the platter portion, or the camera capturing the image, the camera interior or exterior to the housing.

* * * * *